US008295990B2

(12) United States Patent
Venkatakrishnan et al.

(10) Patent No.: US 8,295,990 B2
(45) Date of Patent: Oct. 23, 2012

(54) LOW COST AND FLEXIBLE ENERGY MANAGEMENT SYSTEM WITH A SCHEDULING CAPABILITY

(75) Inventors: Natarajan Venkatakrishnan, Louisville, KY (US); Michael Francis Finch, Louisville, KY (US); Robert Marten Bultman, Louisville, KY (US); Timothy Dale Worthington, Crestwood, KY (US); David C. Bingham, Louisville, KY (US); Jeff Donald Drake, Louisville, KY (US); William Anthony Watts, Louisville, KY (US); Kevin Farrelly Nolan, Louisville, KY (US); Cathy Diane Emery, Louisville, KY (US); Henry Kobraei, Louisville, KY (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 12/983,446

(22) Filed: Jan. 3, 2011

(65) Prior Publication Data
US 2011/0202198 A1    Aug. 18, 2011

Related U.S. Application Data

(60) Provisional application No. 61/304,712, filed on Feb. 15, 2010.

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G01R 21/00* (2006.01)
*G01R 21/06* (2006.01)

(52) U.S. Cl. ........ 700/296; 700/291; 700/295; 700/297; 702/60; 702/61; 702/62

(58) Field of Classification Search .............. 700/22, 700/286, 291, 295–297; 702/60–62
See application file for complete search history.

(56) References Cited

U.S. PATENT DOCUMENTS

| 6,029,092 | A  | * | 2/2000  | Stein ........................... 700/11 |
| 7,844,699 | B1 | * | 11/2010 | Horrocks et al. ............ 709/224 |
| 8,024,073 | B2 | * | 9/2011  | Imes et al. ................... 700/276 |

(Continued)

FOREIGN PATENT DOCUMENTS

WO    2009/086485 A1    7/2009

OTHER PUBLICATIONS

U.S. Appl. No. 12/853,334, filed Aug. 10, 2010, Henry Kobraei.

(Continued)

*Primary Examiner* — Ramesh Patel
(74) *Attorney, Agent, or Firm* — Global Patent Operation

(57) ABSTRACT

A method and system for controlling the operation of accessories in a home energy management system which manages a plurality of communication networks. The schedules are generated by using a central controller and interacting with a user interface found on a device separate from the central controller. The plurality of schedules are stored in the storage of the central controller, and a current schedule is selected from the stored schedules. The selected schedule is loaded onto an accessory through one of the communication channels for controlling the associate accessory.

20 Claims, 15 Drawing Sheets

U.S. PATENT DOCUMENTS

| | | | |
|---|---|---|---|
| 2002/0097851 A1* | 7/2002 | Daum et al. | 379/102.03 |
| 2003/0014521 A1* | 1/2003 | Elson et al. | 709/225 |
| 2010/0217452 A1* | 8/2010 | McCord et al. | 700/295 |
| 2010/0217549 A1* | 8/2010 | Galvin et al. | 702/62 |
| 2011/0106328 A1* | 5/2011 | Zhou et al. | 700/291 |
| 2011/0140906 A1* | 6/2011 | Kobraei et al. | 340/815.45 |
| 2011/0153100 A1* | 6/2011 | Besore et al. | 700/291 |
| 2011/0183733 A1* | 7/2011 | Yoshida et al. | 463/1 |
| 2011/0185196 A1* | 7/2011 | Asano et al. | 713/300 |

OTHER PUBLICATIONS

U.S. Appl. No. 12/983,425, filed Jan. 3, 2011, Natarajan Venkatakrishnan.

U.S. Appl. No. 12/983,471, filed Jan. 3, 2011, Natarajan Venkatakrishnan.

U.S. Appl. No. 12/983,488, filed Jan. 3, 2011, Natarajan Venkatakrishnan.

U.S. Appl. No. 12/983,512, filed Jan. 3, 2011, Natarajan Venkatakrishnan.

U.S. Appl. No. 12/983,533, filed Jan. 3, 2011, Natarajan Venkatakrishnan.

European Search Report issued in connection with EP Patent Application No. 11175690.4, Dec. 2, 2011.

* cited by examiner

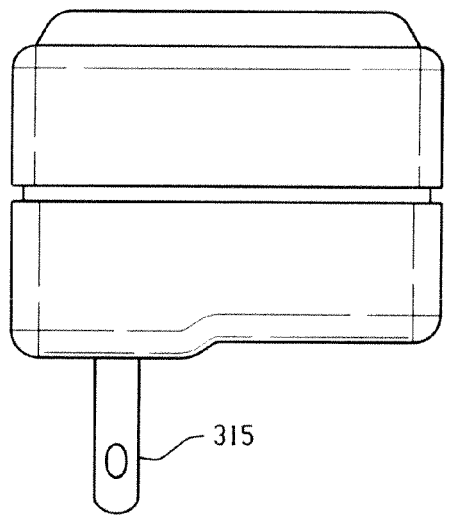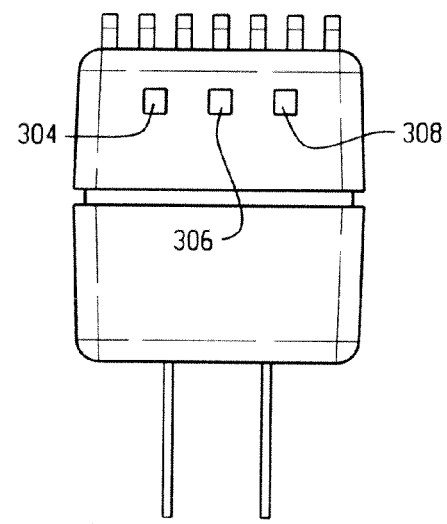
*Fig. 4A*  *Fig. 4B*
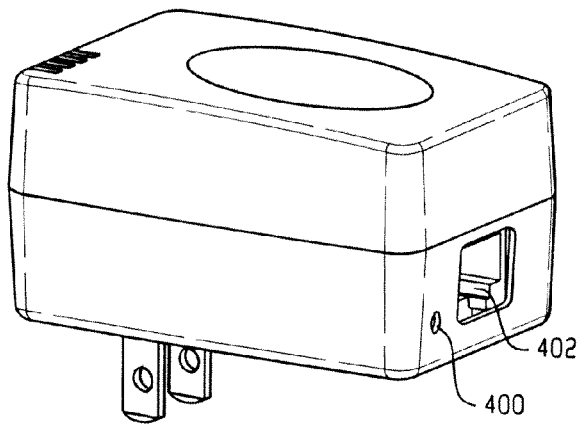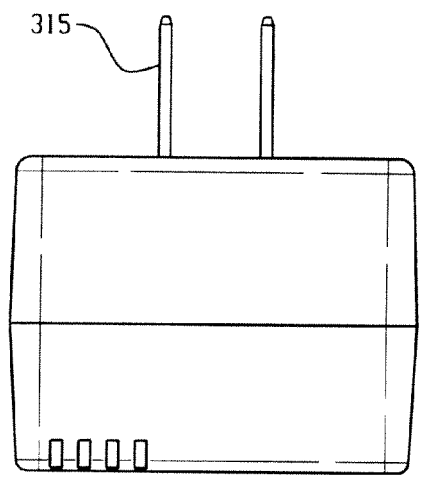
*Fig. 4C*  *Fig. 4D*

STEPS FOR REMOTE AGENT (RA) DATA ACCESS:

1. RA SENDS REQUEST TO HEG. BOTH ARE ON SAME LAN.
   http://<HEG address>/senddata

2. HEG ACCEPTS REQUEST AND ASSEMBLES XML

3. HEG RESPONDS WITH XML CONTAINING THE REQUIRED DATA

4. RA FORMATS THE RESPONSE AND DISPLAYS TO USER

| I. BYTES | 1 | 2 | 2 | 2 |
|---|---|---|---|---|
| II. DATA TYPE | 8-BITS ENUMERATED | UNSIGNED 16-BIT INTEGER | SIGNED 16-BIT INTEGER | SIGNED 16-BIT INTEGER |
| III. FIELD NAME | TRANSITION 1 DAY OF WEEK | TRANSITION TIME 1 | HIGH SET POINT 1 | LOW SET POINT 1 |

| IV. BYTES | VARIABLE | 1 | 2 | 2 |
|---|---|---|---|---|
| V. DATA TYPE | ... | 8-BITS ENUMERATED | UNSIGNED 16-BIT INTEGER | SIGNED 16-BIT INTEGER |
| VI. FIELD NAME | ... | TRANSITION n DAY OF WEEK | TRANSITION TIME n | HIGH SET POINT n |

| VII. BYTES | 2 |
|---|---|
| VIII. DATA TYPE | SIGNED 16-BIT INTEGER |
| IX. FIELD NAME | LOW SET POINT n |

Fig. 12

LOW COST AND FLEXIBLE ENERGY MANAGEMENT SYSTEM WITH A SCHEDULING CAPABILITY

INCORPORATION BY REFERENCE

This application claims the benefit of priority to U.S. Provisional Patent Application No. 61/304,712, filed Feb. 15, 2010, entitled "Low Cost And Flexible Energy Management System", by Venkatakrishnan et al.; U.S. patent application Ser. No. 12/853,342, filed Aug. 10, 2010, entitled "Sub-Metering Hardware For Measuring Energy Data Of Energy Consuming Device", by Kobraei et al.; and U.S. patent application Ser. No. 12/853,334, filed Aug. 10, 2010, entitled "Diagnostics Using Sub-Metering Device" by Kobraei et al., the disclosures of each of which are incorporated herein by reference in their entireties.

BACKGROUND OF THE DISCLOSURE

The following disclosure relates to energy management, and more particularly to a premises energy management system for management of household consumer appliances, as well as other energy consuming devices and/or systems found in the home, at times called herein as accessories or network accessories. The present disclosure finds particular application to a device which controls operation of the accessories (e.g., consumer appliances, as well as other energy consuming devices and/or systems), and acts as a controller/gateway between a Utility company network and the consumer appliances, as well as other energy consuming devices and/or systems. The controller/gateway device to be discussed below is at times called herein a Home Energy Gateway (HEG).

Currently Utility companies commonly charge a flat rate for energy, but with the increasing cost of fuel prices and high energy usage during certain parts of the day, Utility companies have to buy more energy to supply consumers during peak demand. Consequently, Utility companies are beginning to charge higher rates during peak demand. If peak demand can be lowered, then a potential cost savings can be achieved and the peak load that the Utility company has to accommodate is lessened.

One proposed third party solution is to provide a system where a controller switches the actual energy supply to the appliance or control unit on and off. However, there is no active control beyond the mere on/off switching. It is believed that others in the industry cease some operations of certain appliances during on-peak time.

Additionally, some electrical Utility companies are moving to an Advanced Metering Infrastructure (AMI) system which needs to communicate with appliances, HVAC, water heaters, etc., in a home or office building. All electrical Utility companies (more than 3,000 in the US) will not be using the same communication method and protocol to signal in the AMI system. Similarly, known systems do not communicate directly with the appliance using a variety of communication methods and protocols, nor is a modular and standard method created for communication devices to interface and to communicate selectable operational modes to the main controller of the appliance.

Home energy management (e.g., HEM) systems are being used to reduce energy consumption in homes and buildings, in a consumer friendly/compatible manner. Existing HEMs are commonly placed in one of two general categories:

In the first category, the HEM is in the form of a special custom configured computer with an integrated display, which communicates to devices in the home and stores data, and also has simple algorithms to enable energy reduction. This type of device may also include a keypad for data entry or the display may be a touch screen. In either arrangement, the display, computer and key pad (if used) are formed as a single unit. This single unit is either integrated in a unitary housing, or if the display is not in the same housing, the display and computer are otherwise connected/associated upon delivery from the factory and/or synchronized or tuned to work as a single unit.

In the second category, the HEM is in the form of a low cost router/gateway device in a home that collects information from devices within the home and sends it to a remote server and in return receives control commands from the remote server and transmits it to energy consuming devices in the home. In this category, again, as in the first, the HEM may be a custom configured device including a computer and integrated or otherwise connected/associated display (and keypad, if used) designed as a single unit. Alternately, the HEM maybe implemented as home computer such as lap top or desk top operating software to customize the home computer for this use.

Both of the current existing types have significant disadvantages due to high consumer cost, low flexibility and increased system complexity.

The first category requires a large upfront cost to the consumer, because the cost of providing an integrated display on the HEM very expensive. In addition, the electronics required to drive the display is complex and expensive. Further, from a consumer point of view, they are forced to add one more display screen to their home in addition to the home computer, smart phones, televisions and the displays on pre-existing home devices such as thermostats, appliance displays etc.

The second category of HEM involves a substantial cost to provide the server infrastructure and data transfer. In addition, this type of HEM must be connected continuously with a remote server otherwise energy data logging and energy saving commands for the devices in the home will be lost during service disruptions. In addition, this configuration requires connection to the Internet to access and view data. Therefore this second configuration is very limiting in areas where Internet penetration is very low These HEMs do not take into consideration that data bandwidth required to support a network of energy consuming devices is much smaller than the data bandwidth required for the networking of consumer electronics products, which is usually high bandwidth and high speed. The networking standards, including the physical layer, networking layer and application layers are therefore not optimized for the end use.

Further, consumers want to be able to view and control energy consumption information through a variety of consumer electronic devices available in the home. To enable this it is required that energy consumption and control information must be easily transferable from the networks of energy consuming devices to networks of consumer electronics devices. In addition, consumers are used to interacting with consumer electronics devices. So the consumer interaction data on a consumer electronics device should be able to flow into the network for energy consuming devices and to enable command and control of the energy consuming devices which has not been a consideration of existing systems.

The present disclosure is intended to address these and other issues.

SUMMARY OF THE DISCLOSURE

A method and system for controlling the operation of accessories in a home energy management system which manages a plurality of communication networks. Schedule for operation of one or more of the accessories are generated by using a central controller and interacting with a user interface found on a device separate from the central controller. The schedules are stored in the storage of the central controller, and a current schedule is selected from the stored schedules. The selected schedule is loaded onto an accessory through one of the communication channels for controlling the associate accessory.

BRIEF DESCRIPTION OF THE DRAWINGS

FIG. 12 is an example message payload to update a schedule.

DETAILED DESCRIPTION OF THE PREFERRED EMBODIMENTS

Figure 1:
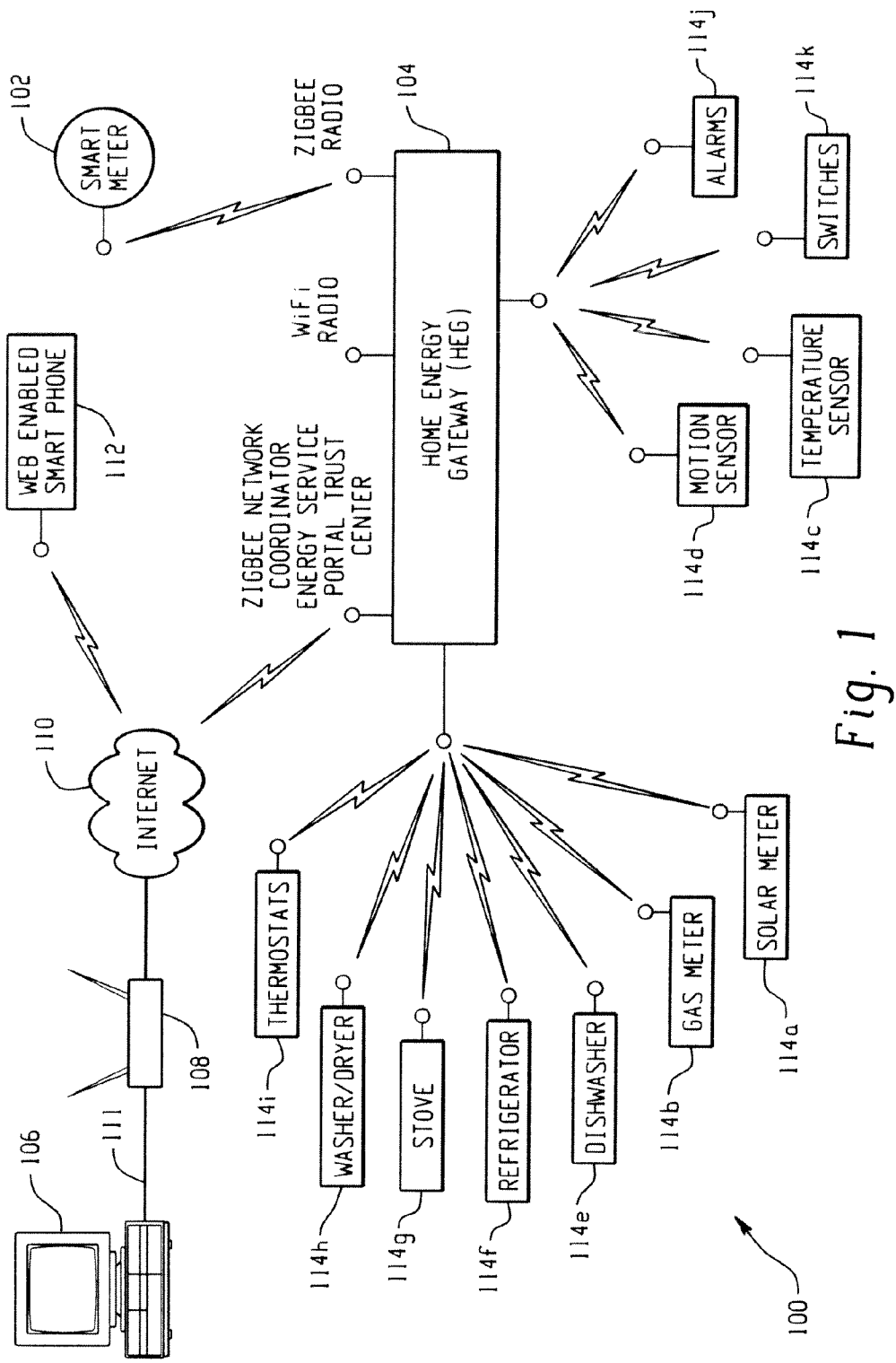
FIG. 1 illustrates a system in which the concepts of the present application are implemented.

FIG. 1 is an exemplary implementation of a home/premises energy management system 100 according to the present application.

The main source of information flow for the home is shown as smart electric meter 102 acting as trust center, coordinator, and/or and energy service portal (ESP), and which is configured in operative connection/communication with a home energy gateway (HEG) 104 of the present application.

It is well known that the functions of smart meter 102 may be separated into different devices. For example, if the home does not have a smart meter 102—so the electric meter functions only as a meter to provide consumption information—other components can be used to provide the additional capabilities. For example, homes without smart meter 102, can have the metering functionality of smart meter 102 replaced with a simple radio and current transformer (CT) configuration. Also, there are devices that can be placed on the outside of the meter to communicate consumption by reading pulse counts or the rotating disk of the meter. In this embodiment, smart meter 102 is shown with an IEEE 802.15.4 radio (such as in the configuration of a ZigBee type; where ZigBee is a specification for a suite of high level communication protocols using small, low-power digital radios based on the IEEE 802.15.4 standard for wireless home area networks (WHANs), but the meter could also communicate by a number of other standards such as IEEE 1901 (e.g., Home Plug Green Phy or Home Plug AV specifications), among others.

Computer 106 (such as a desk top, lap top of other computing device) is in operative attachment to modem/router 108, a common manner of attaching computers to internet 110. In FIG. 1, computer 106 is connected to modem/router 108 by a wired IEEE 802.3 (Ethernet) connection 111. However, it is to be appreciated the connection could be made by other known arrangements such as an IEEE 802.11 (Wi-Fi) connection, power line communication/power line carrier (PLC) connection, among others. In one embodiment, the PLC connection is made using an adaptor such as sold by Netgear Inc. of San Jose Calif. or other manufacturer for that purpose. Also, although a modem/router arrangement is shown in system 100, it is not required, and the system would function for its primary purpose of monitoring and displaying energy consumption information without such an arrangement. In that case computer 106 would connect directly to HEG 104 via a wired or wireless connection.

A web/internet enabled smart phone (or other smart handheld device) 112 is configured to communicate with HEG 104 for displaying data and configuring accessories (such as home appliances 114a-114k. Accessories 114a-114k fall into two main categories sensors and devices (where, depending on how the accessories are used, some will fall into both categories).

Examples of sensors include solar meters 114a, gas meters 114b, temperature sensors 114c, motion sensors 114d, and appliances reporting their power consumption (such as dishwashers 114e, refrigerators 114f, stoves 114g, washers/dryers 114h, etc.). Devices include thermostats 114i, alarms 114j and simple switches 114k, along with the appliances (e.g., dishwashers 114e, etc.), when performing their normal functions. The foregoing are just some examples of accessories to which the concepts of the present application will apply.

The HEG 104 is constructed with computational capabilities and multiple communication technologies but without its own integral display screen, its audio visual display capability being limited to status indicators as hereinafter described. Rather it is configured to communicate with remote devices having user interface displays, such as for example, personal computers, smart phones, web-enabled TV, etc, so as to communicate with the user via these displays. In contrast to existing controllers (such as a HEM) used in home energy systems, HEG 104 is significantly smaller, cheaper, and consumes less power. The HEG 104 also has the capability of operating over multiple communication networks which use different formats, protocols, and bandwidths. This allows HEG 104 to acquire and manipulate (e.g., reformat) data of one communication network (e.g., that which monitors/controls the home appliances) and to supply that manipulated data to another communication network (e.g., to the consumer electronics network, such as to a home computer, smart phone, web-enabled TV, etc.), even though these networks are not generally compatible. The manipulation or reformation includes putting the data in a format and/or location (e.g., the database 206 of FIG. 2) whereby it is accessible by the other communication networks. In some cases the reformatting may only need to provide the data to a database accessible to the other communication networks, while in still other cases the present system translates the data from a protocol understandable by one communication into a protocol understandable by the other communication networks As another example, HEG 104 is connected to system loads (e.g., the home appliances, etc.) over one type of communication network, to the Utility company over a different communication network, and to a display over a third different communication network. In one particular embodiment connection to the display is via a Wi-Fi communication network, connection to the Utility Company (over the meter) is via a ZigBee communication network, and connection to the home accessory (sensor/device/appliance) network is over the third. Alternatively, in a home where the accessories and Utility Company's rules are different, the data could be structured differently. For example, the whole home consumption could be available over the Internet or via a ZigBee meter on the second network. Further, in addition to the display, several home automation accessories including pool controllers, emergency generators, and storage batteries are designed to be accessed over Ethernet using Internet Protocol (IP).

Figure 2:
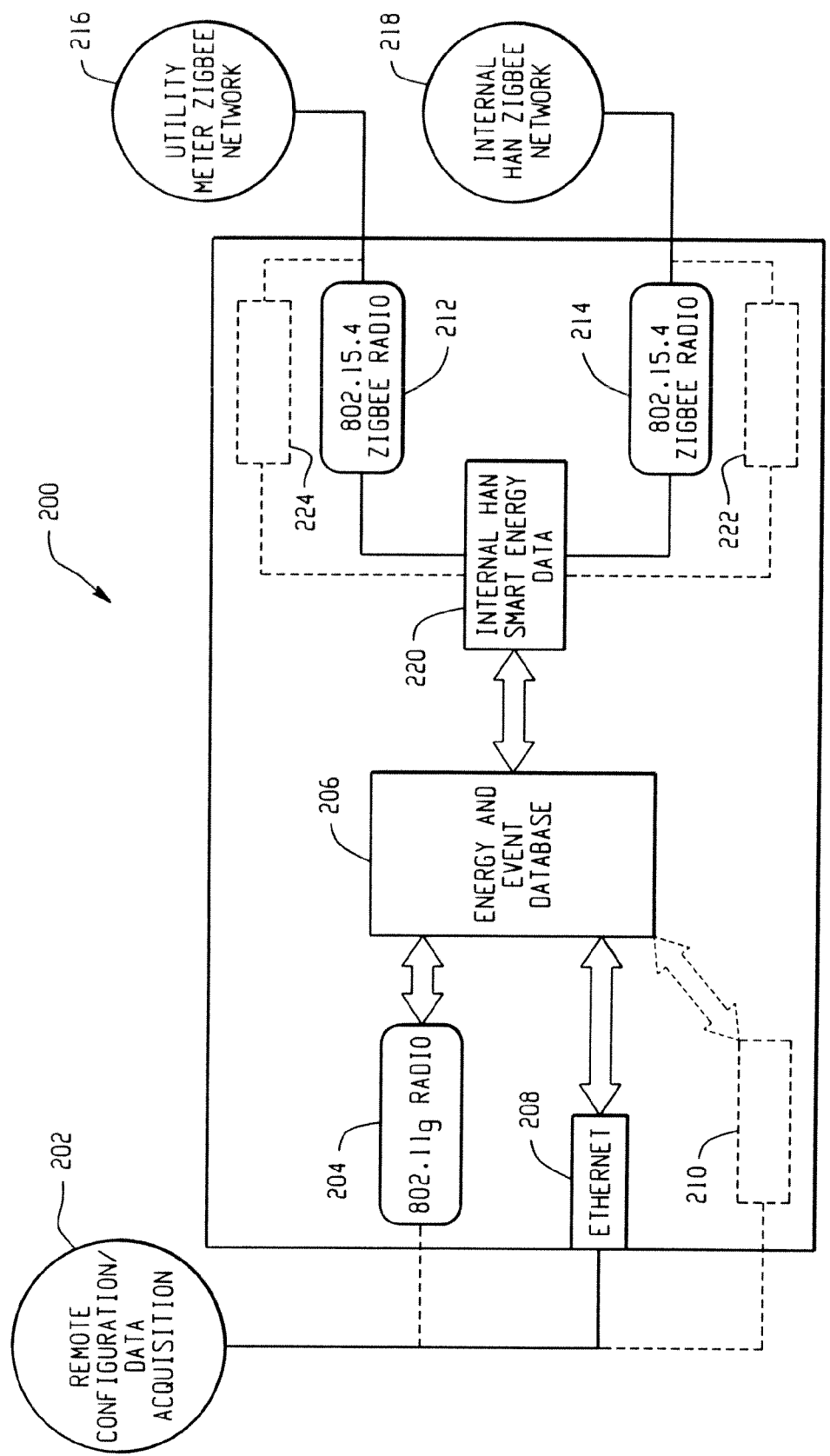
FIG. 2 is a block diagram of a Home Energy Gateway (HEG) of the present application.

Turning to FIG. 2 depicted is a block diagram 200 illustrating one embodiment of HEG 104. On the left hand side of the figure outside of block diagram 200 is remote configuration and data acquisition block (and is understood to include displays of computing devices, web/internet enabled phones, and other devices that are separate from the HEG) 202. The external data and remote configuration requests are received into block 200 via Wi-Fi radio block 204, which in turn accesses energy and event database 206. The external data and remote configuration requests of block 202 could also enter block diagram 200 via Ethernet port 208 in order to access the energy and event database 206. In still a further embodiment a power line communication (PLC) adapter 210 (dotted lines) may be used with or as an alternative to the Ethernet port 208, in order to input the external data and remote configuration requests 202 into the energy and event database 206. Blocks 204, 208, and 210, alone or in various combinations are understood to be a first data interface channel/block.

On the right hand side of FIG. 2 is a second data interface channel/block 212 (such as a 802.15.4 Zigbee radio) and a third data interface channel/block 214 (such as a 802.15.4 Zigbee radio). The second data interface channel/block 212 is configured to send and receive data and configuration messages to/from utility meter Zigbee network 216, and the third data interface channel/block 214 is configured to send and receive data and configuration messages to/from the internal home area network (HAN) (e.g., data and configuration messages from accessories/appliances in the system) 218. The data and messages from these sources are also provided to energy and event database 206, via internal HAN smart energy block 220, which includes capabilities to identify data/information from the accessories. Functions of database 206 and HAN smart energy block 220 are discussed in more detail below. In still a further embodiment power line interfaces 222, 224 (dotted lines) may be included with or as an alternative to the blocks 212, 214, and can be defined as the respective second and third interface channels/blocks.

Figure 3:
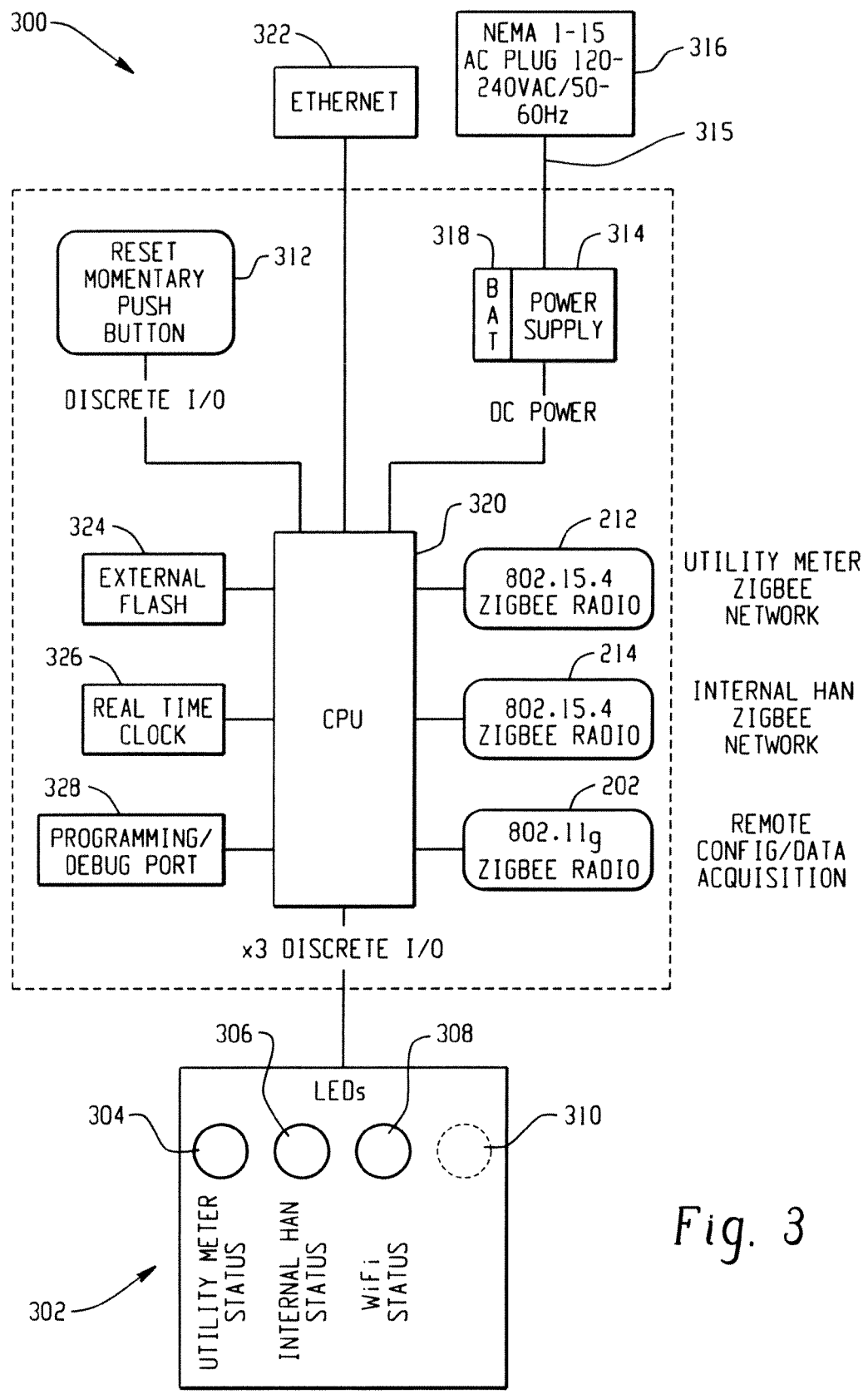
FIG. 3 is a hardware block diagram of the HEG.

FIG. 3 shows a more detailed hardware block diagram 300 of HEG 104. This figure includes a depiction of input/output (I/O) block 302. The I/O block 302 includes LEDs or other status identification devices 304, 306, and 308 which are used to convey network status for the three individual networks of HEG 104. The LEDs convey status from off (no network), flashing (network available), to solid lit (joined network) for each network. Optionally an additional LED or other status identification device 310 is provided to identify power availability. Also, if HEG 104 is designed to handle additional communication networks an additional LED or other status/identification device (not shown) may be added. These status lights allow a user to confirm the HEG is working. By this design if there is an issue, a user may connect to HEG 104 via a user interface held on a computing device having a display (e.g., a home computer, a portable computer, an internet enabled phone, a web enabled phone, an internet enabled handheld computing device, or web enabled handheld computing device, etc.) for more detailed investigation of the issue. Also depicted is reset push button 312 on an external surface of the HEG, which (as will be shown below) may be assessed by a user externally on the HEG unit itself. A power supply 314 built into the HEG is attached directly to external prongs 315 (see FIGS. 4A-4P for more detailed views), which plug directly into a wall outlet 316. In some embodiments the prongs are removable and/or collapsible. When removable the prongs may be removed and/or changed with and/or without a tool. The removable and/or collapsible design of the prongs allows for compact shipping and/or carrying of the HEG. The built in power supply configured in some embodiments to charge an internal storage battery 318. Power supply 314 supplies power to CPU/processor 320. Additional connections to CPU/processor 320 include an Ethernet connection 322, an external flash 324, a real time clock 326 and programming/debug port 328, which along with other elements described above form the single board computer of the HEG 104.

In one embodiment, the HEG hardware comprises of a single board computer with the following specification:
Samsung S3C2450 32 bit RISC Microprocessor ARM926EJS, 400 MHz
DDR2 SDRAM (32 MB)
NAND Flash Memory for Embedded Linux & HEG Software (16 MB)
NAND Flash Memory for Database Storage (16 MB)

The single board computer is configured to interact with multiple communication interfaces which can have different physical, networking and application layers.

A first data interface channel (which may have an Ethernet and Wi-Fi interface) includes the following specification:
IEEE 802.11 b|g Wi-Fi
WPA, WPA2, WEP-40, WEP-104, 802.1x, PEAP, LEAP, TLS, TTLS, FAST
MAC Address Filtering
1011 00 Base-T Ethernet Connectivity Second and third data interface channels (e.g., the two Zigbee interfaces) have in one embodiment, the following specification:
IEEE 802.15.4 Compliant 2.4 GHz Wireless Interface
Smart Energy Profile, Home Automation Profile
Transmit Power: 20 dBm, Receive Sensitivity. 0~-100 dBm
AES128-bit Encryption
Install Code using 128-bit Oseas Hash Function
ECC Key Exchange using Certicom Certificates
SEP 1.0 Security Requirements
CBKE ZigBee Link Key Security
ZigBee Pro Feature Set The two Zigbee communication interfaces are provided so the HEG can talk to two separate energy networks.

Using one Zigbee interface, (referred to as the second data interface channel or second network) the HEG communicates with the smart meter network. This interface reads the smart meter, an energy-metering device, and records the data in the database of the HEG.

The HEG communicates with the devices within the home using the other Zigbee communication interface (referred to as the third data interface channel or third network). Using this interface, the HEG reads the consumption of the individual energy consuming devices and records it in the database.

Utility communications such as price signals demand response signals and text messages are received through the second data interface channel, recorded in the database, and communicated to the devices in the home through the third data interface channel. The command and control information of the energy consuming devices and their response to Utility signals is received through the third data interface channel, recorded in a database, and communicated to the Utility company via the second data interface channel, the communication being routed through the Utility smart meter.

The HEG can also be programmed to vary the response of energy consuming devices to utility communication based on consumer preferences. The consumer may, if desired, program the schedule, mode of operation and create unique device response to utility messages. This programming is communicated through the first data interface channel.

The stored events, energy data, utility messages and consumer setting preferences are also accessed through the first data interface channel, which operates at a higher bandwidth and uses a consumer electronics compatible/friendly communication protocol. For example, in some embodiments this communication could be over Wi-Fi or Ethernet.

The user interface is, in one embodiment, a software application that resides in one of the consumer electronics products in a home, on a home computing device, a web enabled phone, etc. These home accessories/devices communicate to the HEG through a predefined communication. The user interface may request specific data from the HEG like historical electricity consumption information and the HEG can push information to devices in the network of accessories (set-up such as in a Local Area Network (LAN)), like price changes or utility messages, with all communication exchanges occurring thru commands based on this communication protocol. In addition, the energy consuming devices can be controlled or interfaced through the HEG, the user interface communicating with the HEG using this communication protocol over the first data interface channel and the HEG communicating with the energy consuming devices with a low bandwidth protocol using a different physical communication layer.

The term "communication protocol" commonly is known to refer to at least three aspects—language, transport, and session. The term "language" is defined as the structure used to communicate data or commands including but not limited to such well known languages as: XML, JSON-RPC, XML-RPC, SOAP, bit stream, or line terminated string. The term "transport" is defined as the protocol used to deliver the data or commands, and includes but is not limited to well-known protocols such as UDP, TCP, and HTTP. "Session" is defined as the period during which the Device is pushing data via a socket based connection, or the Device is sending data in response to being polled. Examples of data being pushed include TCP socket streams, and examples of polling include the well known restful, create, read, update, and delete methods.

The HEG plays a key role in the interaction with the Utility Company in registering and communicating with devices within the home. Typically devices that have to work with the smart grid thru the smart meter need to be registered with the smart meter. This means that for every energy consuming device that is installed in a consumer's home, the consumer has to contact the Utility and provide them an install code to register the device, which requires time and resources for both the Utility Company and the consumer. The HEG simplifies this process because only the HEG device needs to be registered with the Utility Company by the consumer. Once the HEG is registered to the smart meter, the HEG then acts as a single point gateway for the Utility Company. In this way all other devices in the home are registered with the HEG and communicate with the HEG. The HEG then summarizes device actions, responses and status and communicates a single message to the Utility Company. This saves resources and infrastructure for the Utility Company's meter system as there is only one device communicating from the home, rather than 10 to 15 devices receiving messages, which would otherwise require a large amount of bandwidth.

Figure 4E:
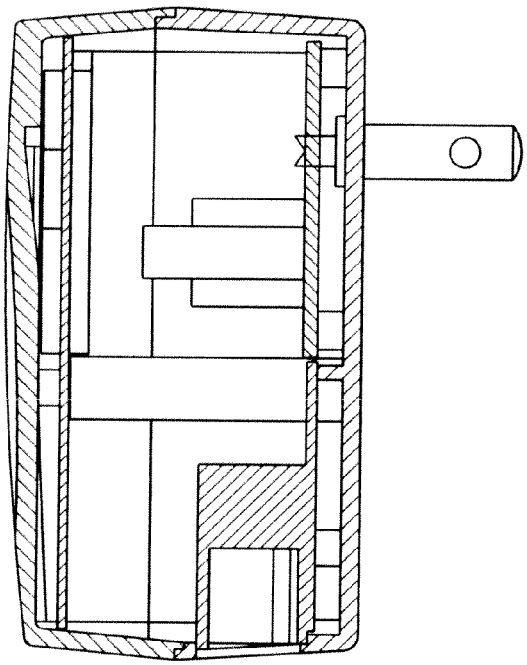
FIGS. 4A-4P illustrates views of the physical HBG device.
Figure 4F:
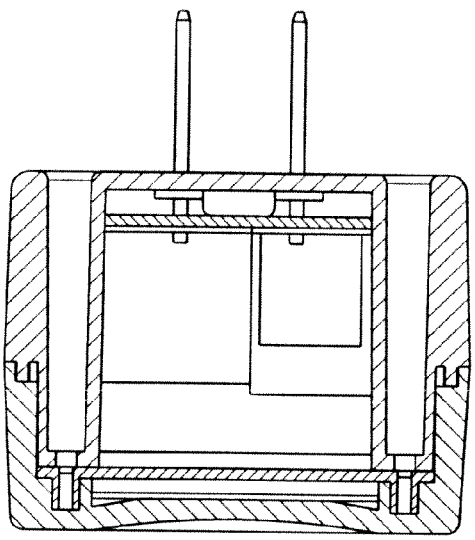
Figure 4G:
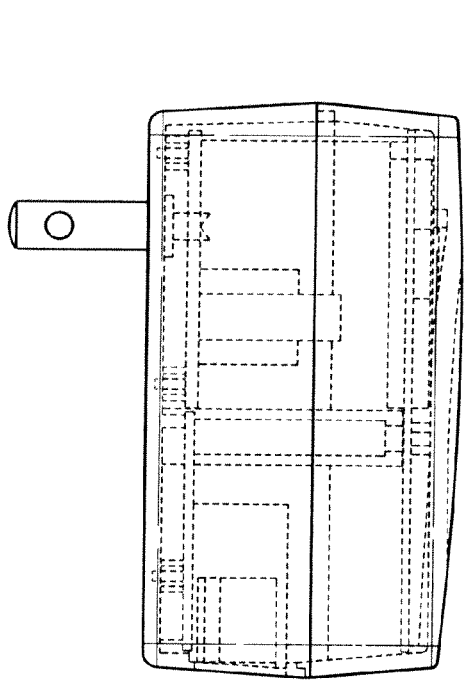
Figure 4H:
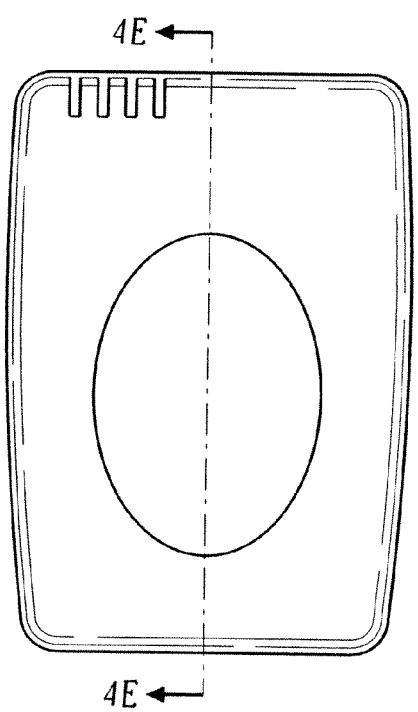
Figure 4I:
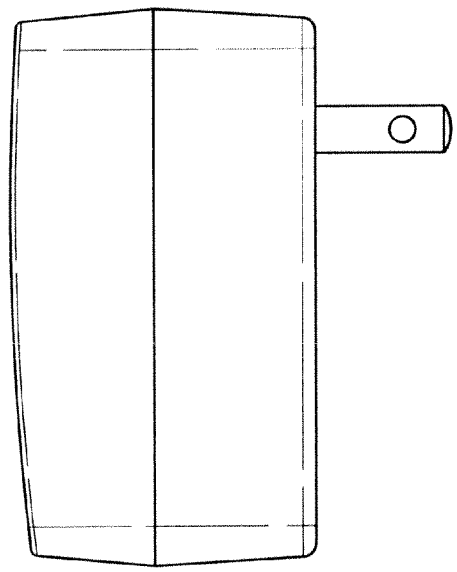
Figure 4J:
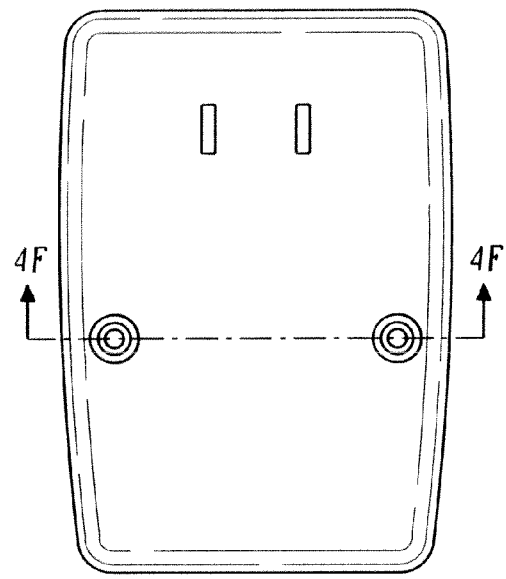
Figure 4K:
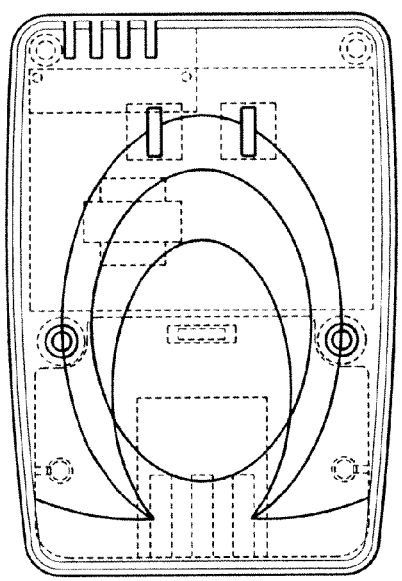
Figure 4L:
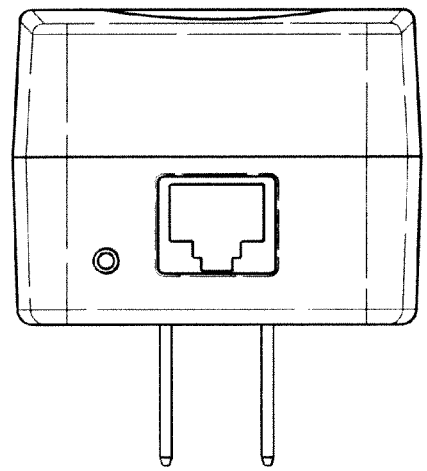
Figure 4M:
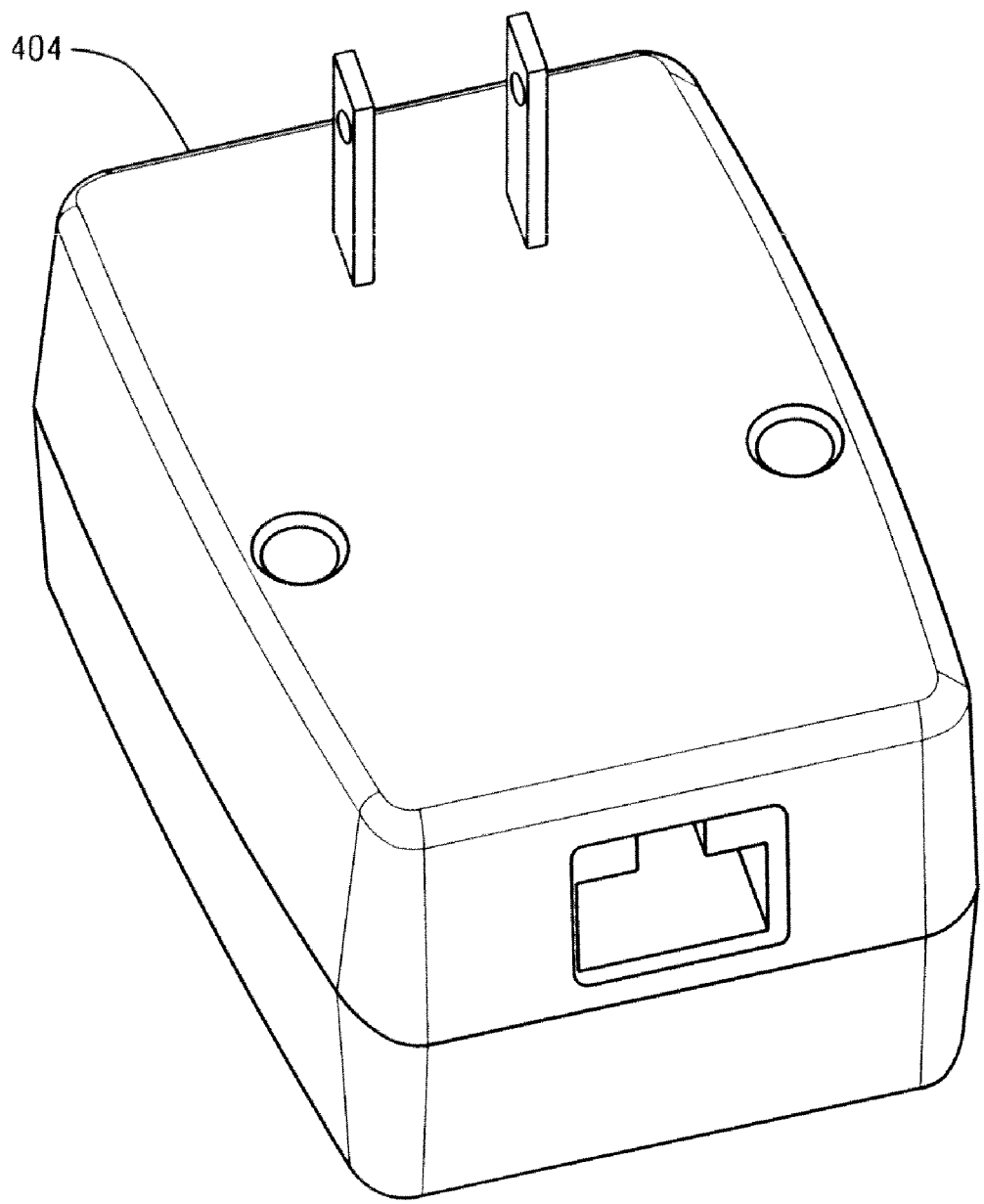
Figure 4N:
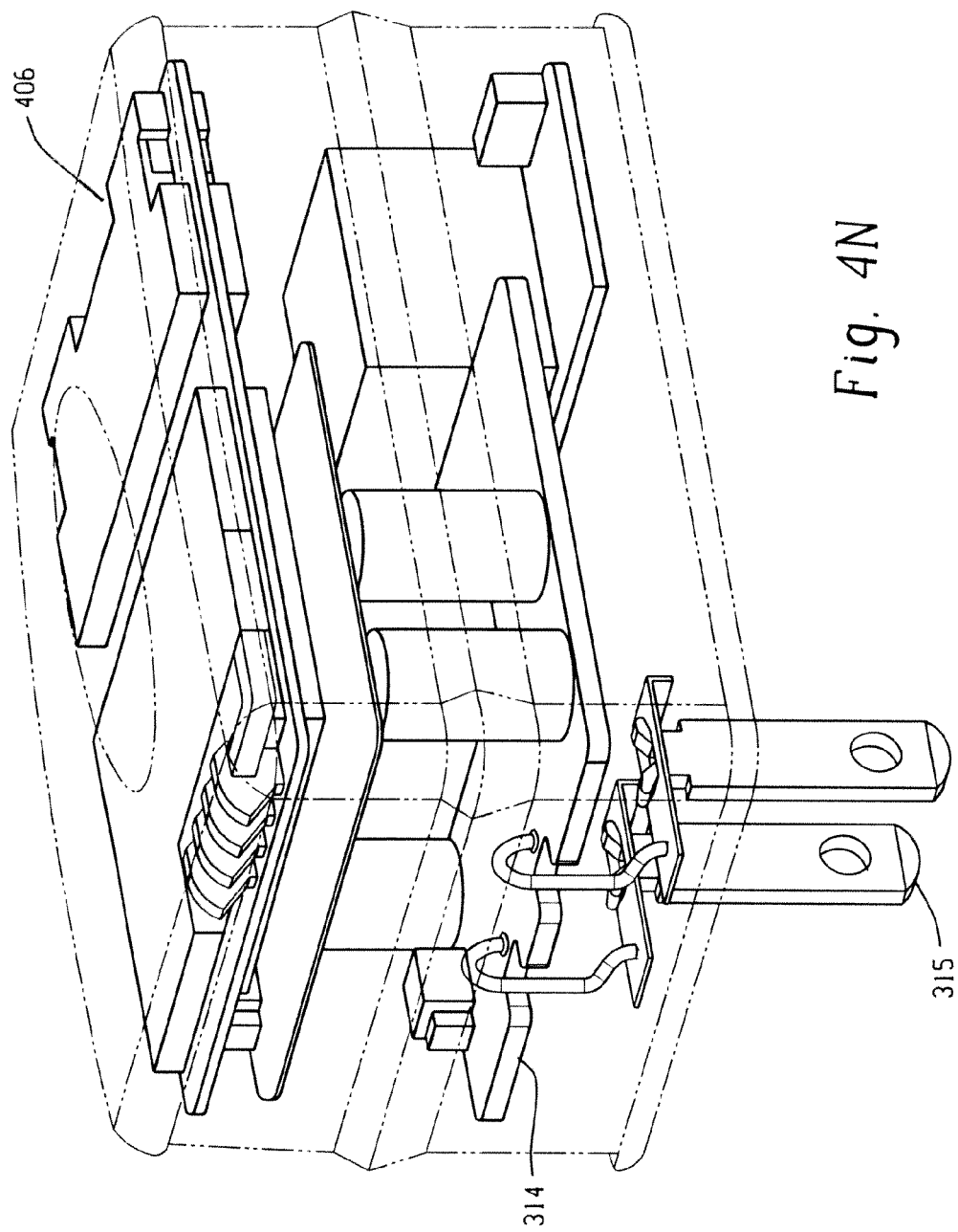
Figure 4O:
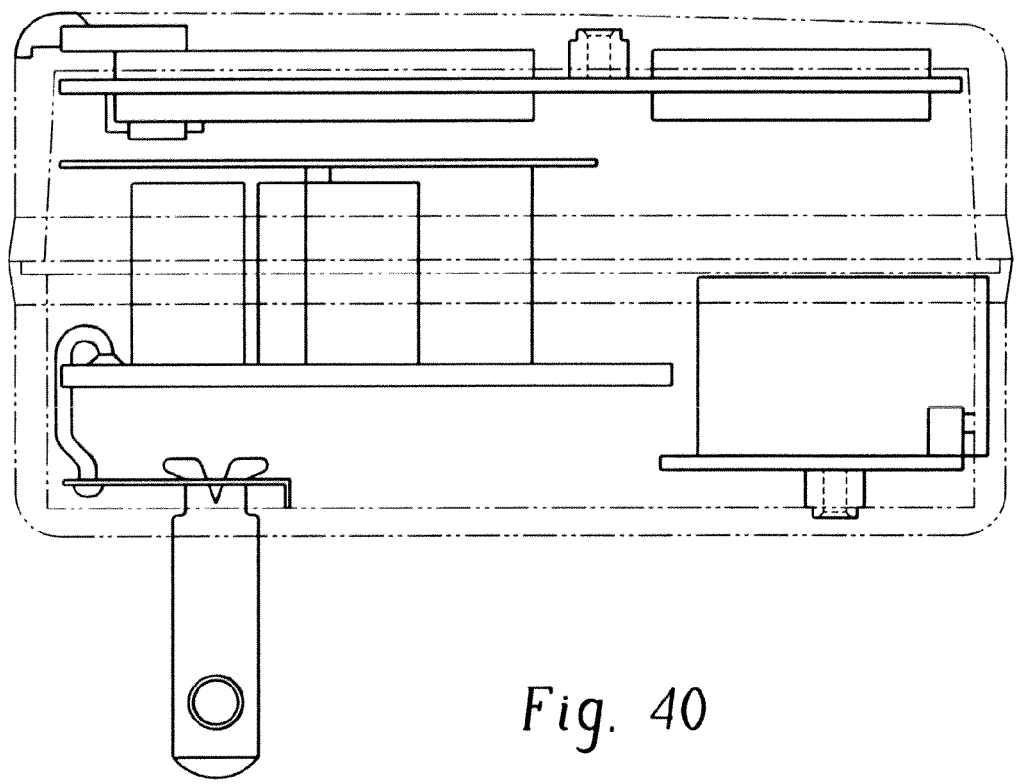
Figure 4P:
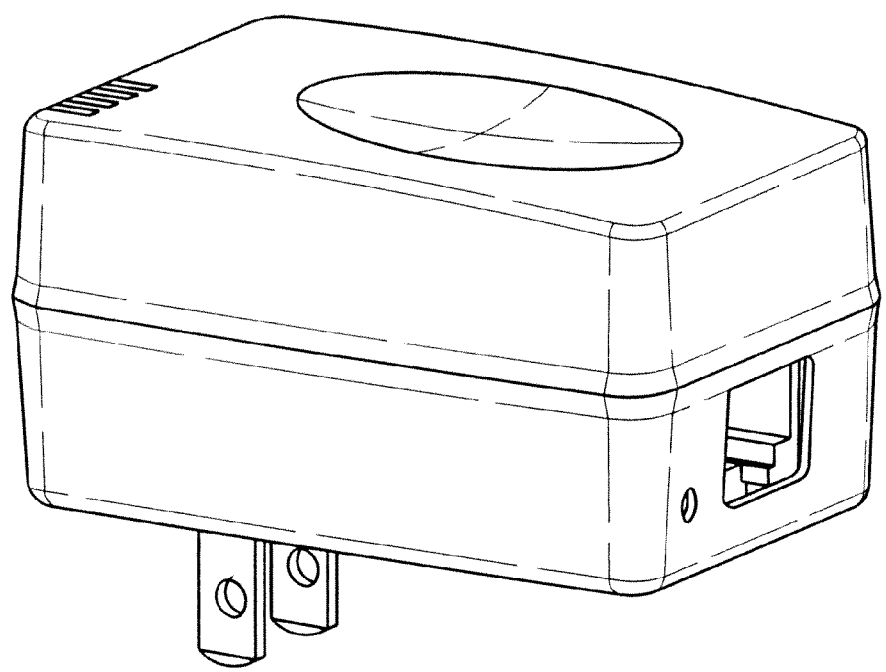

Turning now to FIGS. 4A-4P illustrated are various views of HEG 104. HEG 104 has no display screen or input keys. This configuration allows HEG 104 to be configured in a very compact design. In one embodiment, this results in the HEG having approximate dimensions of 53(W)×72(H)×55(D) mm (or 2.09(W)×2.83(H)×2.16(D) inches), with an approximate depth (D) of 37 mm (or 1.45 inches) not including the prongs of the plug. The volume of the HEG is approximately 160 cm^3 and the weight of the HEG being approximately 100 g. It is therefore small enough to be plugged into a standard wall outlet, and does not need space on a counter, tabletop and does not need to be attached to a wall or other surface with screws or adhesive. Because it is not physically connected to a separate display or keyboard, there are no wires to add clutter or get caught on items. Having the power supply 314 (e.g., see FIG. 4N) embedded and/or integrated in the HEG helps maintain a small HEG size, while allowing placement in small out of the way areas. It also allows access to the power lines for PLC communication. Such a small power supply can also be tuned to exactly the needs of the HEG, instead of selecting from a standard plug transformer, and avoids the risk of a consumer plugging in the wrong wall adaptor. The design also includes additional flame retardant materials in the HEG housing, and securely attaches the outlet prongs to the housing. It is understood that in other embodiments the power supply may be configured separate from the HEG and the power would then be delivered though an input cord or other supply arrangement.

FIG. 4C shows recessed reset button 400 (corresponding to block 312 of FIG. 3) and Ethernet input 402 (e.g., see 208 of FIG. 3). In this embodiment reset button 400 is recessed for activation by a pointed tool (e.g., a pen or pencil tip). This design avoids inadvertent resets. Of course in alternative implementations the reset button may be an external button accessible by a user's finger. Prongs 315 are securely attached to the HEG body in such manner that the prongs will carry the weight of the HEG body when the prongs are connected to a wall outlet. The prongs 315 are, in at least one embodiment connected directly to power supply 314 to carry power as shown graphically, for example, in FIG. 4N. In other embodiments, such as in a power line communication embodiment, the prongs are further connected within the gateway for data communications via the external power lines coupled to the wall outlet with devices such as but not limited to external/remote servers. FIGS. 4A-4N further show the single unitary housing concept (e.g., see 404 of FIG. 4M) and the single board computer concept (e.g., see 406 of FIG. 4N), among other design concepts discussed herein.

Figure 5:
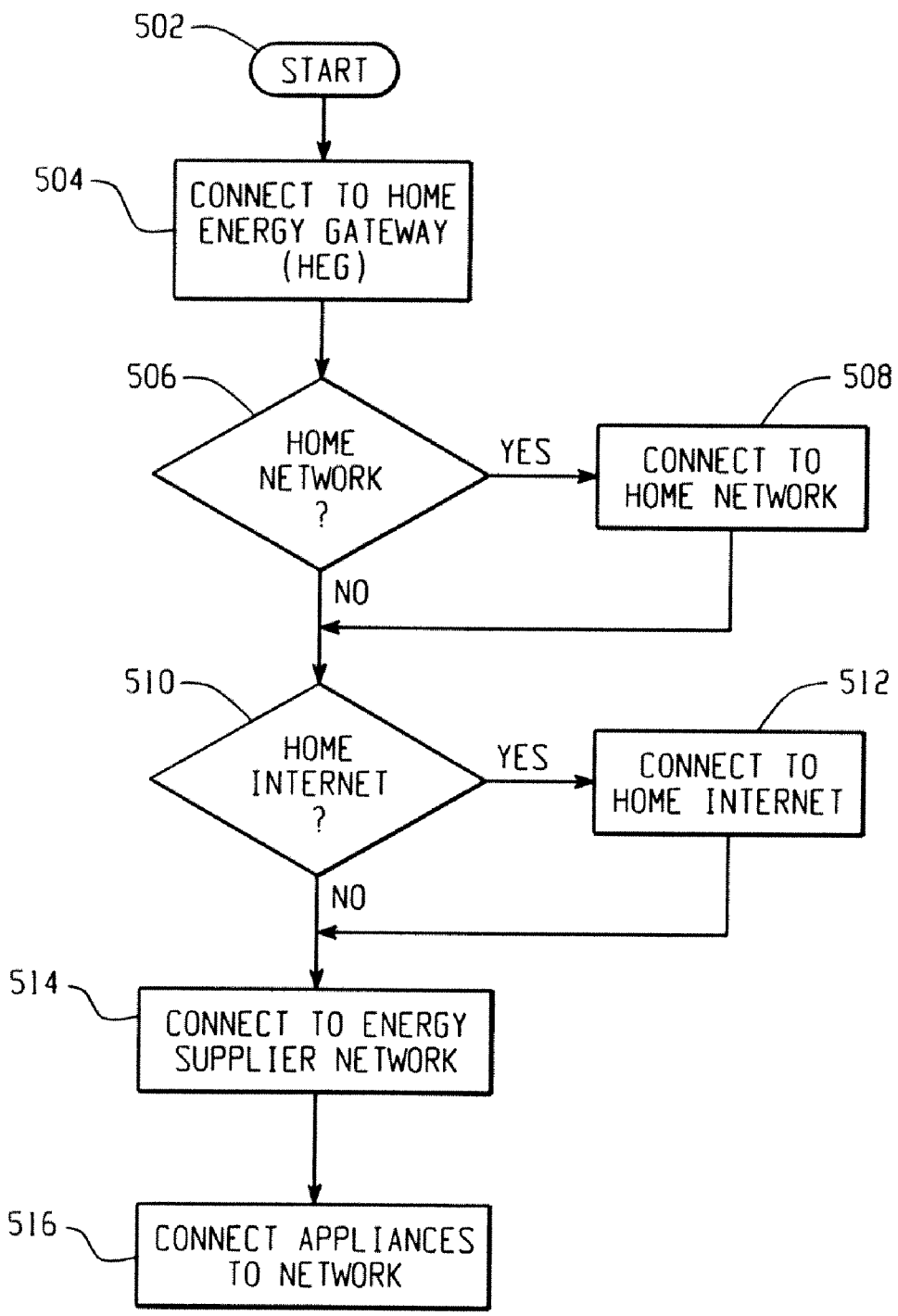
FIG. 5 is a flow diagram for connecting the HEG.

Turning now to the setup of the HEG, the consumer/user will need to configure HEG 104 to monitor energy consumption. Prior to starting to commission the HEG, the consumer loads specific Client Application Software (CAS) onto his/her computer or smart phone. Typically this software would be downloaded over the Internet or purchased from the phone provider. The software may be a general purpose Java application that will run on any PC, or may be tailored specifically to the physical limitations and operating system of the HEG, which is common in the cellular phone business. Alternatively a Web CAS could also be used, where a Web CAS is typically downloaded on demand each time it is executed, allowing developers to update the application for all users as needed. FIG. 5 is a flow diagram 500 which illustrates, for one embodiment, the steps undertaken to achieve the configuration described above. An expanded discussion of configuring the HEG as outlined in FIG. 5 is set forth in later sections of this disclosure. After starting 502, a user connects to the HEG 504 by providing the HEG with power (e.g., plugging it into a home outlet) and accessing the HEG via the CAS. The CAS allows the user to provide the HEG with a name so it may be identified in the network (see FIG. 6). Once connected, if there is a home wireless network (such as Wi-Fi) 506, the user may optionally connect the HEG to that network 508 (see FIG. 7). Next, if the user has a home Internet connection 510, the HEG can be connected to this network 512 (see FIG. 8). Once these steps are accomplished, the user connects the HEG to the energy supplier (e.g., Utility company) network 514 (see FIG. 9). Finally, the user connects the appliances (and other systems) to the HEG 516 (see FIG. 10).

1. Connecting to the Device. (FIG. 6)

Figures 6, 7:
FIG. 6 is a graphical illustration of a step in setting up the HEG.
FIG. 7 is a graphical illustration of a step of connecting the HEG to a Wi-Fi access point.

Turning now to FIG. 6, as mentioned above, a particular aspect of HEG 104 is the value and flexibility obtained by not having a dedicated, integrated user interface display. Not having such a display requires some initial set-up steps in the configuration of the HEG into the home energy network (or HAN) in order to connect the HEG to the network, via the first interface channel. These steps include:

a. Connect the HEG to its power source (e.g., a common home power outlet). This will power the LEDs (304-308) causing them to light.
  b. Connect an Ethernet cable from computer to device to Ethernet input (208), or establish a peer-to-peer wireless connection (e.g., wireless input 204).
  c. Install HEG setup software (such as CAS) on a smart phone, computer or other device capable of operating software.
  d. Use the software which employs zero-configuration networking (such as the Apple Corps Bonjour from Apple Corp) to detect the HEG. Once the HEG is detected, the user provides the HEG with a name and password to prevent others from modifying their personal settings.

2. Connecting to Home Network (FIG. 7)

As mentioned above, step 508 of FIG. 5 is optional. However, for homes with a Wi-Fi network and where the HEG is presently attached via an Ethernet connection, step 508 is available. In this case, the Ethernet cable would be disconnected and the HEG can then be moved to an out of the way home electrical outlet as it operates in via the Wi-Fi connection. By this action the consumer will still have access to the HEG over their home network but the HEG would not need a prime electrical outlet. If the HEG is replacing a HEM or other type of controller which has a built in or otherwise connected display and is therefore mounted on a wall for viewing of the display, the HEG in the wireless environment would of course not need to be mounted on a wall and could, again be, located in an out of the way electrical outlet. If the user/consumer does not have a home wireless network, they may connect the HEG to a router to share their Internet connection (or IP Network) or remain directly connected to their computer if they do not have an Internet connection. If connected over Wi-Fi the Wi-Fi LED on the HEG will illuminate.

Figures 8, 9:
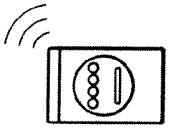
FIG. 8 is a graphical illustration of a step of connecting the HEG to the Internet.
FIG. 9 is a graphical illustration of a step of connecting the HEG and a smart meter.

3. Connecting to Home Internet (FIG. 8)

This step is also optional, and is not required for operation of the HEG. No special configuration is required on the HEG. Depending on the security implemented on the consumer's Internet connection, some modification to their router and/or firewall may be required. In some instances the use of the HEG may be advantageous over a "Cloud Computing" model for home energy control, as that the data storage for the HEG is local.

4. Connecting to Energy Supplier Network (FIG. 9)

Connection steps for connecting in a typical smart meter environment and for connecting in an Internet environment, via the second interface channel are now described:

a. The following describes the steps to take for a typical smart meter application.
    i. For a smart meter, either wired or wireless, the HEG will connect to the smart meter over a second network. The user/consumer locates their install code that is displayed in their CAS. Alternatively the install code can be written on the HEG or supplied with its documentation. The consumer then takes that install code and depending on their Utility either enters the install code into a browser window or they call their Utility's Consumer Service Center.
    ii. Also they will add identifying information for the home in which the HEG is located. Depending on the sophistication of the utility network, they may be asked to enter their address, account number of their bill, or to call and get a special identifying code.
    iii. Once this is complete, a command is sent from the CAS (e.g., software added to the homeowner's computing device) to the HEG over the IP Network, via the first interface channel, to have the HEG start the joining process on the Utility network.
    iv. Once the appropriate security has been negotiated, the HEG will send a confirmation back to the CAS over the IP network to indicate that the connection has been made to the Utility network, via the second interface channel.
    v. The HEG will also turn the Utility Network LED ON to notify the consumer that it is connected. This allows for the consumer to determine the state of the network just by glancing at the HEG, without connecting an I/O device.
    vi. The HEG will determine which of the devices on the Utility network is the home's billing meter. Multiple devices could say that they are a meter.
    vii. Any devices that are found by the HEG that are not the Utility (revenue meter are saved for configuring as part of the home network.

This connection to the energy supply network is simplest if there is only one meter on the Utility network, but there may be more (i.e., there may be sub-meters)

Typically if there is a single device that is a meter and the single device has a Utility Services Interface (USI), the single device will be the source of energy information (e.g., price load control commands etc.). That is it is the billing meter. However in some areas a separate device may be employed to act as the Utility Services Interface (USI).

Therefore, if there are two devices that both are meters and neither meter is the USI, the HEG undertakes additional investigation. For example, a plug-in hybrid electric vehicle (PHEV) charger could be on the Utility network as a meter and as a load control device, so it could be turned off during a grid emergency. Then the HEG would assign the one that is not a load control device as the Utility meter. It is noted some meters have disconnect switches installed inside of them, even in this case, the utility typically does not provide control of that switch to the HAN, but only on its backhaul network.

Figure 10:
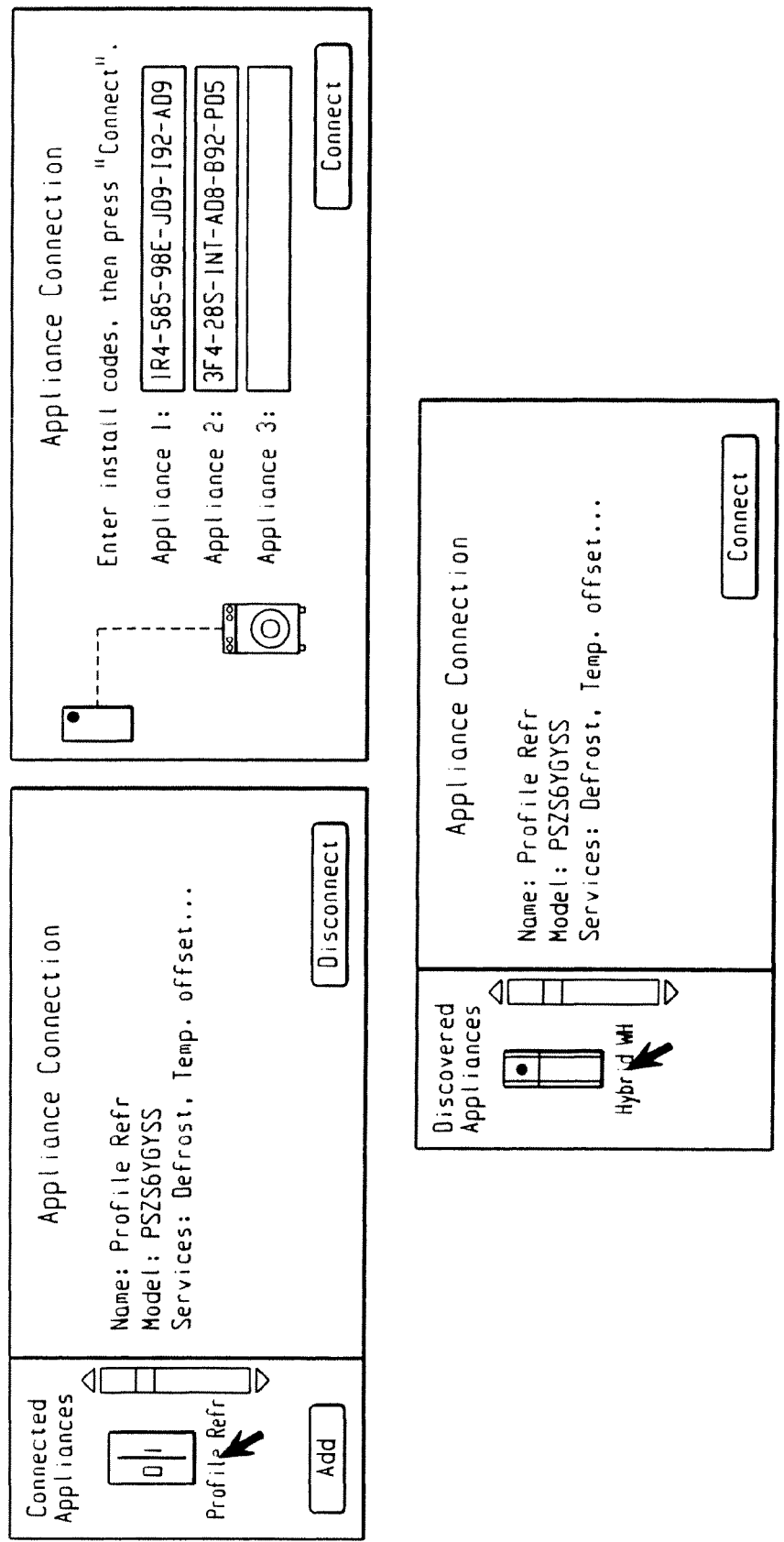
FIG. 10 is a graphical illustration of a step of making connections to appliances.

With continuing attention to the connecting the HEG, connection steps for connection in an Internet environment for energy supplier information via the second interface channel rather than in a smart meter environment, are now described:
  b. For Internet based energy supplier information.
    i. In this case the install code will typically not be required, since the Utility network is not being used. The consumer will start by entering identifying information on the home that the HEG is in into a CAS window. Depending on the sophistication of the utility network, they may need to enter their address, account number off their bill, or they may need to call and get a special identification code. They may also have to enter a specific URI that indicates where the HEG can obtain pricing information.
    ii. Once this is complete, an XML message command will be sent from the CAS to the HEG over the IP Network to have the HEG contact the utility information page over the internet.
    iii. Once the appropriate security has been negotiated, the HEG will send a confirmation back to the CAS over the communication (e.g., IP) network to indicate that the connection has been made.
5. Connecting Appliances to Network. (FIG. 10)

Typically appliances will be installed on a home network (such as a LAN) that is entirely maintained by the homeowner. The ZigBee network is used for this purpose in the exemplar, but that is not critical to the invention. Some devices, such as a Thermostat, or PHEV charger may be tied directly to the Utility network in the same manner as the HEG, if for instance, the PHEV qualifies for a different rate or the consumer is getting a credit for allowing the Utility to control their HVAC. In this case the consumer can skip directly to step vi.
  i. The consumer will enter the install code of the device into a CAS window; the CAS will then transfer this message to the HEG over the communication (e.g., IP) network.
  ii. The HEG will create a third network, via the third interface channel, and look for a device that is attempting to join. The third network LED will flash.
  iii. The consumer will then be asked to press a button or take similar action on the device to tell it to join the network. The precise action to take is dependent on the devices instructions.
  iv. The HEG will exchange security information over the third network with the device and compare it with the information received over the first network, via the first interface channel. If the information indicated the device is to be trusted, it is let onto the network. In the situation above, the third network LED will become lit.
  v. The HEM will detect that there is a device on the network and will gain basic information about the device. The device will provide some configuration data, for example that it is a washer, a water heater, or that it is a load control device or a meter.
  vi. The HEM will bring up a list of devices that it has found. For ease of identifying the devices, it is easiest if the consumer adds all the devices individually and fills in the identifying information on each as it is found. The consumer can also add a user-friendly name to his/her device at this time for future identification.
  1. For a device with a device type of appliance, the consumer may need to add a name like refrigerator, or dryer.
  2. If there are multiple thermostats, the consumer may label one as upstairs and one as downstairs so that they can control them independently.
  3. Some devices will be added just as a meter. For example one such device may be a meter on a solar or wind generation panel. The consumer will have the opportunity to select the identity of the device from a list. Based on this selection the HEG will identify the accessory as a load or source (also called a supply). This is important later when creating reports, because loads are a subset of the revenue meter, but the sources are additions to the revenue meter.
  4. Storage batteries will need to be identified as such so that the HEG can read a field to indicate direction of power flow. While current standards have this field as optional, it is understood that a storage device would support it.
    vii. The above steps can be completed as many times as needed to enter all the devices the consumer wants to be included into the network. In addition to devices mentioned above, a whole host of home automation devices can be added, including but not being limited to motion sensors, door sensors, lighting controls, switches, smart plugs, bathroom scales. Anything which can function by turning on/off, adjusting up or down, or provides information on the amount of something can be easily integrated into the data structures of the HEG.
6. Connecting to an External Server.

Attachment to an external server configuration, including but not limited to a web server having a web service interface, and/or a cloud-computing device is optional. An example, of one such connection is to a Google Power Meter (GPM) service from Google Inc. To make this type of connection the user/consumer would, in one embodiment, use their CAS to connect to GPM, and the data would then be ported to the cloud server. Either the user/consumer or the cloud server may select only to accept a portion of the data. For example, the user/consumer may select to pass the utility power meter to the cloud server, so he/she can access it from work, or the cloud server may limit the consumer to a certain number of devices (e.g., two devices) with certain (e.g., 15 minutes) increments between points.
7. Connecting Zigbee Device Numerous commercial devices are available for measuring and controlling plug loads and larger loads, as well as ZigBee home automation for controlling lights, security and comfort. One such example is the ZBLC30-Dual (30/15A) Relay with energy meter. This ZigBee 110/220V Dual-relay (30/15A) describes itself as a controller with energy meter which remotely controls high current heavy loads such as water heaters, pool pumps, pool heaters, electric vehicle charges, air conditioners, etc. Using the wireless ZigBee protocol allows the switch to constantly measure the power delivered to the load and report various parameters such as real and apparent power based on high accuracy industry standards. This makes possible the intelligent management of large appliances. This component is provided with both normally open (NO) and normally closed (NC) contacts for maximum flexibility including fail-safe configurations.
8. Connecting an External device.

There are numerous devices available to consumers which have Ethernet or Wi-Fi capabilities. For example a Pentair pool controller from Pentair Water Pool and Spa, or an alarm system controller from Smart Home, are just two examples.

By use of a special purpose application program (APP) these and other such devices can communicate with the consumer's energy management system so that they can make adjustments to all of the systems in one place and set their own priorities. These APPs are loaded by the same update program which manages the BEG software.

Figure 11:
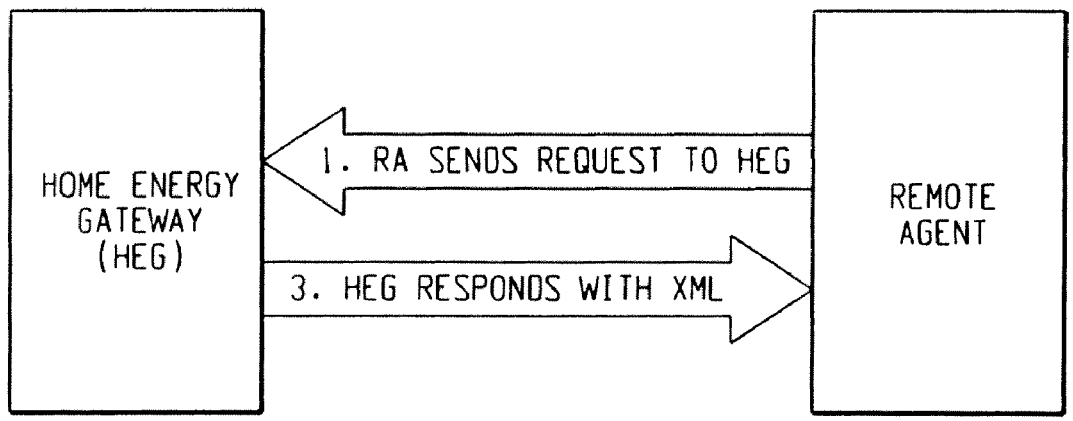
FIG. 11 illustrates remote agent data access.

Turning now to of operation of the HEG, it is understood the HEG is designed to operate in different selectable operational modes and such different modes of operation use different data flows. Set out below are examples of various data flows, which can be obtained by use of the HEG.
1. Power consumption data from meter to database:
   a. HEG sets up a timer.
   b. Periodically pings meter for consumption on the second network.
   c. Stores consumption data in data base.
2. Price signal sent to an appliance:
   a. HEG receives a price schedule or price change from Utility over the second network.
   b. HEG stores price data in table in memory for future use in calculating cost reports.
   c. HEG reviews scheduling priorities received from consumer over the first interface.
   d. HEG sends load shed command to appliance or system (e.g., pool pump disconnect box) over third network.
3. Utility direct load control command sent to load control box on an accessory (e.g., pool pump).
   a. HEG receives a price schedule or price change from Utility over the second network.
   b. HEG reviews scheduling priorities received from consumer over the first interface.
   c. HEG sends load shed command to pool pump disconnect box over the third network.
4. Power consumption data sent from an accessory (e.g., smart appliance) to HEG database:
   a. HEG sets up a timer.
   b. Periodically pings meter for consumption on the second network. The meter being at least one of a meter monitoring whole home consumption and/or a meter monitoring energy consumption at the particular appliance.
   c. Stores consumption data in data base.
5. Daily power consumption cost chart sent to remote device (e.g., computing device, hand held device, etc). In one embodiment the daily power consumption cost chart expresses the daily consumption of power by one or more of the accessories and/or overall consumption of the premises or home (FIG. 11):
   a. Handheld device contacts HEG over the first interface (Wi-Fi), sending scripted request for data.
   b. HEG reviews database and assembles data requested. Either the HEG could retain cost data in a single table, or it could pull consumption and price data from separate tables and combine into cost data.
   c. HEG formats data for report using open scripting commands such as XML.
   d. HEG sends requested information to handheld device over the first interface.
6. Power consumption data sent from HEG to an external server (e.g., web server, etc.):
   a. Consumer sets up conditions for transmitting data to external server over the first interface.
      i. Consumer selects server from list or types in URL
      ii. Consumer selects how frequently data is to be ported
      iii. Consumer selects which data is to be ported
   b. HEG sets up timer to meet consumer's request.
   c. HEG assembles the subset of data requested by the consumer and formats for transmission on Internet.
   d. HEG posts data to webserver that consumer has selected.
7. Message sent from Utility to computer display, smart appliance display or other computing device display:
   a. HEG receives text message from Utility over the second interface.
   b. HEG reviews instructions from consumer on where Utility messages should go (Computer screen, Thermostat Screen, TV Set, Hand Held, Dedicated energy display) received over the first interface.
   c. HEG formats message appropriately for Interface and pushes message to appropriate display device.

Once the consumer has the HEG connected to meters and devices and collecting data they can start to take advantage of its capabilities. A particular benefit of this system, which uses the HEG without a dedicated or integrated display, is the ability to use a high quality display to view data and interact with appliances without having to pay for it separately. Many consumers already have large displays of 17", 35", even 52" diagonals that they use for entertainment systems. Many of these devices are provided with Web CASs. Accessing the electricity consumption of a home on a TV screen will provide a more readable display of their consumption habits to the consumer than the small monochrome in-home displays that Utilities have been using in pilots. In addition being able to look at the change in energy consumption when you turn on a range or dryer, the present design provides consumers with an increased awareness of where there energy dollar is going. Because the consumer displays (e.g., TVs, computers, smart phones) are adapted to graphical display, they are well suited to display this type of information.

This improved interface also allows the consumer to fine tune their response for different appliances with more detail than was possible over a typical appliance control screen. Such customization can be accomplished either in conjunction with energy prices, weather information, time of day, occupancy or other external parameter, or just as a user defined rule without any outside parameters. Use of the described interface may be used to have the HEG function in a variety of different modes of operation. Examples of such different modes of operation are discussed below, as well as in other section of this discussion.

A first example: A dishwasher cycle is delayed because of high energy costs. However the water heater is not heating either. The HEG provides the consumer with the option of waiting until the water heater has caught up before starting the dishwasher.

Another dishwasher option: The consumer can determine to not allow (or always require) heated dry, extra pre-washes or extra heat on a dishwasher at any time despite what is selected at the controls of the dishwasher. This feature may be valuable for people whose children are assisting with meal clean up.

A second example: The consumer starts their dryer in a delay start mode, but before the delay time is completed energy price goes up. The consumer will be asked if they still want the dryer to start when scheduled.

An additional dryer example is to limit the maximum heat regardless of the energy level selected. This balance of saving energy at the expense of drying time could be made at any time, or could be done to prevent children or spouse from damaging garments by drying at too high a temperature.

An example of using weather is to prohibit dryer operation when the external temperature was above 80 degrees to avoid competing with the air conditioning, or to prohibit dryer use if the sun was shining and line-dry clothes instead.

A third example: The consumer can automate the decision for which of various modes he/she would like his/her water heater to operate in. Depending on the water heater, the modes that can be selected from include: Electric Resistive Heaters, Electric Heat Pump, Gas, Solar, and Off. He/she can use electric price, weather, gas price and home occupancy to select from.

A washing machine example: The consumer could use this feature to control which temperatures can be selected, or prohibit using the washer at certain electric costs.

The improved user interface is also an advantage when programming devices. Programmable thermostats are often hard to program via their limited user interfaces. For example, you have to push the menu button twice, then the left button, then the down button to set the hour, then the left button until a full schedule of 7 days with 4-6 events per day have been loaded. The user interface on the HEG with a computer or smartphone can display all of this graphically. Because the consumer is familiar with the interface, the commands are more intuitive. For example, the consumer can drag and drop changes of times, and copy and paste from of one day's schedule to a different day. Once the consumer is happy with the schedule, the whole schedule can be sent to the HEG over a high data rate Ethernet/Wi-Fi connection. The HEG will save the schedule internally. The consumer can build a number of schedules for different modes of operation: Winter (Heating), Summer (Cooling), Summer Vacation (Home empty, cool just slightly, circulate outside air at night); Summer Kids Home (Cool During the day) etc. After the consumer selects one to load, the HEG loads the schedule to the thermostat. Thereafter the consumer can change schedules and return to the original schedule without needing to reenter information.

Turning now to FIG. 12 shown is an example of the data portion of a message payload that could be used to send a schedule to a thermostat. Appropriate headers and checksum fields can be added based on the exact communication protocol established.

The row Bytes is the size of the field. The Data Type and Field Name describe the type of data in each field. The schedule consists of a series of Transition times, high set points, and low set points. Each set point is scheduled to be in effect until the next transition. The variable field can contain multiple transitions until a final (nth) transition for a given day. At midnight the schedule will continue the prior day's last transition until the first transition of the new day. The Day of Week field identifies the day that is being scheduled. Where Day 0 is Sunday, Day 1 is Monday, Day 2 is Tuesday etc. Alternatively a bitmap field could be used to set the same schedule into multiple days simultaneously. The variable field can contain repeated Transitions.

The method of scheduling illustrated by the foregoing example of programming a thermostat is not limited to a thermostat, but for other modes of operation could be similarly applied to other accessories that normally run on a schedule. A different mode of operation, for example, could be a pool pump and spa controller, where high set point is spa temp and low set point is the pool temp.

Another application is setting pool pump run times, where the high and low set points can be set at 0 and 100 to control off and on. A variable speed controller could use 1-99 to indicate a percentage of full run.

This on off scheduling could also be used with a water heater controller so it would not maintain water temperature when the homeowner is scheduled to be at work.

The HEG relies on a number of different software applications/programs/sets. There is software on the HEG itself. There is a second piece of software on the desktop or laptop computer used to configure the HEG and gather data from it. There is a third piece of software on the smart phone. The phone and computer may be further defined by the operating system, or may take advantage of a platform like Java that allows the programs to operate on multiple operating systems. Each of these software applications/programs/sets can be upgraded independently of each other. The desktop (or laptop) and smart phone Apps also have a service that allows for interaction with the HEG. For example the service can ping a server associated with the HEG (e.g., one that specifically supports the HEG as may be established and maintained by or for the HEG manufacturer) every day checking for the latest software release. As new software becomes available, either to correct issues or add features, they can down load the newest HEG software and the push it down to the HEG. This way software sets can be upgraded independently of each other.

Once the HEG knows which appliances are on the network, it can also check the server for updates for those devices, and download that software if needed.

In addition, the present system allows for provisioning (i.e., preparing the system to accept new services) whereby special purpose software can be downloaded. When the consumer buys a new washer, and registers it with the HEG. The software can contact the associated server, and be given an app to download. This app allows the consumer to set more detailed control of the appliance. It would know for instance this particular washer has five wash temperatures. It would then provide the consumer with the opportunity to customize their wash experience. For example the consumer could set the washer to not ever allow sanitation cycles and only allow hot wash when electric prices are at or below a threshold price (e.g., <$0.15 a kW/hr). Alternatively the customer may decide that since they are on a gas water heater, the HEG should not control water temp when electric price changes. Another function that the washer could have is a delayed start feature. If the washer is in the delayed start, the consumer could (through the HEG) either tell the washer to start now, or to delay its start even longer.

Another specific example of software that can be downloaded is monitoring software. This software could be loaded as part of registering the appliance, or the consumer could download and run as part of troubleshooting an issue before deciding to schedule a service call. Either on a preventative basis or in response to a service issue, specific software could be used that checks for issues in the appliance. A fairly simple implementation would be to have the software check for service error codes and present them. A more elaborate appliance with internal power monitoring features would have the appliance check different components and determine if the power draw characteristics are correct.

Then in another mode of operation, over time the HEG can monitor the health of the appliances, either passively by looking at performance or actively by getting health, maintenance, and diagnostic info from the appliance.

An example of passive operation is the monitoring a dryer. The HEG can notice that the dryer says it is in high heat, but never goes over 3 kW. If this occurs on a single occasion this may be a loading or airflow condition, but if it happens repeatedly, it may be a failed open heater.

In a more active mode of operation, the HEG could ping a dishwasher, and ask it for all of its error codes. The HEG can then send that information directly to the GE Server, send it upon the consumer's request, or make it available on screen to consumer when they call for service. Alternatively, the consumer could download more detailed analytical software if they were having issues with a specific appliance that could run diagnostics on the appliance and sends the results back to the GE server so the technician could arrive with the correct part.

In addition to monitoring for service, the monitoring software can also keep the consumer up to date on the status of their home. For example the time remaining on an oven self-clean, the end of cycle on a dishwasher, or the current hot water tank temperatures could be communicated to the HEG by appliances over a the low bandwidth third network. This info can then be sent to the consumer via the first interface to a Wi-Fi enabled smart phone or Web enabled television, or possibly a Bluetooth device. It could also be sent to him/her outside of the home by email, SMS text message or similar method.

Also, as communication protocols in a home converge to common standards, the HEG is also adaptable to operate in a mode of operation to network other devices within the home and to store data. For example the HEG can monitor the health of consumers living in a home. In one such embodiment a bathroom weighing scale is enabled with a communication interface, and the weight of a person is automatically read off the HEG and stored in the data base with a time stamp, every time a person steps on the scale. The HEG is similarly adaptable to read other health parameters like blood pressure, glucose, temperature etc.

In the same way, energy and water consumption in a home is an indicator of daily life in a home. It can indicate activity in a home, the number of people in a home, the health of people in a home, safety and intrusion in a home.

In yet other mode of operation the HEG is adaptable to operate with home automation and home security systems over open standards, coordinating devices trying to control lighting, pool pumps, and other devices. The HEG is also adaptable to share information obtained from the accessories, whereby the accessories act as occupancy or intruder detection systems. For example, if the home security is in the away mode, and the refrigerator door opens, this information is passed to the security system, functioning in a manner just like a motion sensor.

Another option during provisioning is to download a software set that customizes the display so that it essentially duplicates the features of the appliance, but uses large font and improved colors for people with poor visual acuity. People with vision impairment could use a 17" screen with black numbers on a yellow background to set the temperatures on the refrigerator or schedule the self clean on an oven.

Other special purpose software may be offered in conjunction with a Utility company. The consumer may have a special code from their Utility Company which downloads a software set that tracks air conditioner thermostat set-points and passes that information back to a Utility company server. The consumer then gets a bonus for maintaining certain target temperatures and by not overriding set-point changes during grid emergencies.

Another net of specialty software is for commercially available devices. If the consumer buys a device from a third party, they can log on and download the software that blends that device into their network. It may be lighting controls, the pool controller mentioned earlier, or a third party thermostat.

As mentioned in the foregoing discussion, the HEG of the present application is particularly useful in a home energy management network and may receive communication from existing controllers (such as HEMs) and/or replace the controllers (HEMS) in such networks. For example U.S. Ser. No. 12/559,703 describes a home energy management system having a controller which may be replaced by the HEG described above.

The invention has been described with reference to the preferred embodiments. Obviously, modifications and alterations will occur to others upon reading and understanding the preceding detailed description. It is intended that the invention be construed as including all such modifications and alterations.

What is claimed is:

1. In a home energy management system comprising a central controller for managing a plurality of accessories using a plurality of communication networks, a method of providing an accessory within the system with a schedule to control operation of the accessory, the method comprising:
   generating a plurality of schedules employing a user interface on a device separate from the central controller;
   communicating the plurality of schedules to the central controller;
   storing in a storage of the central controller the plurality of schedules;
   selecting a current schedule from the central controller storage;
   communicating to one of the communication networks to load the selected schedule to the accessory; and
   loading the selected schedule onto the accessory.

2. The method of claim 1 wherein the central controller is programmed to vary the response of energy consuming accessories based on user preference defined in the schedules.

3. The method of claim 1 wherein the schedules from the user interface are communicated to the central controller using a communication channel which operates at a different bandwidth than the communication channel used to communicate the stored schedules to the accessory.

4. The method of claim 3 wherein a bandwidth of the channel for communicating the schedules from the user interface to the central controller is higher than the channel on which the stored schedules are communicated to the device.

5. The method of claim 1 wherein the user interface is an application that resides on at least one of a home computer, a portable computer, an internet enabled phone, a web enabled phone, an internet enabled handheld computing device, or web enabled handheld computing device.

6. The method of claim 1 wherein the user interface requests specific data from the central controller including historical electric consumption data and the central controller pushes data to the accessories in the home, including price changes.

7. The method of claim 1 wherein the central controller is configured to control operation of the accessories through implementation of the selected schedule.

8. The method of claim 1 wherein the central controller is configured to control operation of an accessory by at least one of the schedules built by a user, wherein a user builds a number of schedules which are selectively loaded to the accessory by the central controller.

9. The method according to claim 1 wherein the central controller is configured to change schedules in an accessory without user involvement.

10. A premises data management system for transmitting data comprising:
   a first communication network configured to transmit and receive data to and from a user interface;
   an other communication network configured to access data from and provide data to accessories within the premise management system; and
   a home energy gateway located between the first communication network and the other communication network, including (i) a first interface channel, (ii) an other interface channel, wherein the data from the first communication network is communicated via the first interface channel, and the data from the other communication network is communicated via the other interface channel and (iii) a storage mechanism for storing a plurality of schedules to operate at least some of the accessories, wherein the schedules are communicated to the accessories via the other interface channel and the schedules are received by the storage via the first interface channel.

11. The system of claim 10 wherein the home energy gateway is configured to vary the response of accessories based on user preference defined in the schedules.

12. The system of claim 10 wherein the first interface channel in which the schedules from the user interface are communicated operates at a different bandwidth than the other interface channel in which the stored schedules are communicated to the energy consuming devices.

13. The system of claim 12 wherein the first interface channel in which the schedules from the user interface are communicated operates at a higher bandwidth than an other interface in which the stored schedules are communicated to the accessories that are energy consuming devices.

14. The system of claim 10 wherein the user interface is an application that resides on at least one of a home computer, a portable computer, an internet enabled phone, a web enabled phone, an internet enabled handheld computing device, or web enabled handheld computing device.

15. The system of claim 10 wherein the user interface requests specific data from the home energy gateway including historical electric consumption data and the home energy gateway pushes data to the accessories in the home, including price changes.

16. The system of claim 10 wherein the home energy gateway is configured to control operation of the accessories through implementation of the selected schedule.

17. The system of claim 10 wherein the home energy gateway controls operation of the accessories by at least one of the schedules, wherein the schedules are built by a user, and wherein the user builds a number of schedules which are selectively loaded onto the accessories by the home energy gateway.

18. The system according to claim 10 wherein the home energy gateway is configured to change schedules in an accessory without user involvement.

19. The method according to claim 1, wherein the loaded selected schedule includes a series of transitions, and set points used to control operation of the accessory over a period of days.

20. The system according to claim 10, wherein the selected schedule includes a series of transitions, and set points used to control operation of the accessory over a period of days.

* * * * *